United States Patent [19]

Sullivan

[11] Patent Number: 5,641,254
[45] Date of Patent: Jun. 24, 1997

[54] ANCHOR PLATE SECURING METHOD FOR VEHICLE SEAT CARGO

[76] Inventor: Daniel B. Sullivan, 525 Caprice Ct., Raleigh, N.C. 27606

[21] Appl. No.: 390,216

[22] Filed: Feb. 16, 1995

[51] Int. Cl.[6] .................................................. B60P 7/06
[52] U.S. Cl. ........................... 410/98; 410/101; 410/116; 224/275; 24/130; 297/253; 280/801.2
[58] Field of Search ................. 410/96, 97, 98, 410/101, 102, 116; 224/275, 556, 563; 24/136 K, 136 L, 115 M, 130; 248/548, 503, 505; 297/253; 280/801.2

[56] References Cited

U.S. PATENT DOCUMENTS

| | | | |
|---|---|---|---|
| 2,548,993 | 4/1951 | Mierzwa | 410/101 |
| 2,833,347 | 5/1958 | Lucht | 297/253 X |
| 2,877,833 | 4/1959 | Boles | 297/253 X |
| 3,323,186 | 6/1967 | Rennert | 410/116 |
| 3,388,886 | 6/1968 | Tucker | 224/275 |
| 3,828,994 | 8/1974 | Hollins | 224/275 |
| 4,083,312 | 4/1978 | Holman, Jr. | 410/97 |

FOREIGN PATENT DOCUMENTS

91/14598  10/1991  WIPO .................................. 224/275

OTHER PUBLICATIONS

Advertisement for a "Seat Sack" 1 page, no date.

*Primary Examiner*—David A. Bucci
*Assistant Examiner*—Stephen Gordon
*Attorney, Agent, or Firm*—Mason A. Gross

[57] ABSTRACT

This invention relates to a method for restraining cargo securely in or on a vehicle seat. In particular, the invention relates to a method for anchoring a strap, cord, or cable to the vehicle seat which secures and restrains cargo in or on the vehicle seat. The method secures cargo to a vehicle seat having a rear by anchoring a strap to the vehicle seat. The method includes channeling or threading the strap through a wedge-shaped slotted portion communicably attached to an anchor plate, the strap being tightened around the cargo, whereby the anchor plate bears against the rear of the vehicle seat, thereby securing the cargo to the vehicle seat.

22 Claims, 9 Drawing Sheets

ANCHOR PLATE SECURING METHOD FOR VEHICLE SEAT CARGO

BACKGROUND OF THE INVENTION

1. Field of the Invention

This invention relates generally to an apparatus and a method for restraining cargo securely in or on a vehicle seat. In particular, the invention relates to an apparatus and a method for anchoring a strap, cord, or cable to a vehicle seat, which in turn secures and restrains cargo in or on the vehicle seat.

2. Background of the Related Art

As a matter of safety of driver and passengers as well as to prevent potential damage to equipment or belongings, it is important to thoroughly secure, fasten, or restrain cargo being transported in or on the seats of a vehicle. Securing cargo to vehicle seats has been previously accomplished in a myriad of ways, including the use of existing vehicle seat belts, ropes, or bungee cords. However, for any seat in a vehicle, there is no more than one seat belt, and quite often, the positioning of the seat belt and associated buckle or shoulder harness does not easily lend itself to thoroughly secure or restrain cargo being transported in or on the seat. Seat belts themselves have been designed and tested with the idea of maximizing the restraint of human beings, and not cargo, occupying the seats of the vehicle in the event of accident, impact, sudden stopping, or swerving of the vehicle.

In addition, seat belts represent point restraints that typically do not distribute the force of impact or sudden stopping of the vehicle over an absorbing or dampening area or volume. Instead, seat belts impart the force of impact or sudden stopping of the vehicle ultimately to points on the vehicle chassis and/or vehicle body. A common type of seat belt is known, in fact, as a three point system and there is little restraint until inertial effects are exhibited as a result of impact or sudden stopping of the vehicle. Furthermore, most seat belts today do not completely secure or restrain cargo during general transport or prior to an impact or sudden stopping of the vehicle. Other means of strapping cargo, including ropes and bungee cords, do not necessarily offer proper restraint of cargo since strong and convenient attachment locations for securing these means thereto may not exist or may not be in a suitable location within the vehicle.

Without complete and constant restraint of cargo in or on the vehicle seat during transport, it is therefore possible for that cargo to shift position or tumble, even when the vehicle is going around a very mild turn, and especially if that cargo is top heavy and the vehicle is moving at high speed.

SUMMARY OF THE INVENTION

Therefore, one object of the invention is to provide an apparatus for securing cargo in or on a vehicle seat in addition to, or instead of using a seat belt.

Another object of the invention is to provide an apparatus for securing cargo in or on a vehicle seat that uses the dampening action of the seat cushions during a sudden stopping of the vehicle.

A further object of the invention is to provide an apparatus for securing cargo in or on a vehicle seat having a secondary fail-safe method for securing that cargo in the event of material failure during sudden stopping of the vehicle.

One advantage of the invention is that it can secure cargo directly in or on a vehicle seat.

Another advantage of the invention is that it can be used with bucket seats or bench seats in a vehicle.

A further advantage of the invention is that it can be used with straps, cords, cables, or seat belt-like webs.

Yet another advantage of the invention is that it can be easily installed to secure cargo in or on a vehicle seat.

One feature of the invention is that it includes holes or slots with which to thread straps, cords, cables, or seat belt-like webs therethrough.

Another feature of the invention is that it includes an anchor plate that can be brought to bear against the upright cushion and the bottom cushion of a vehicle seat while securing cargo in or on the vehicle seat.

A further feature of the invention is that it includes converging slots in a wedge-shaped region attached to an anchor plate to allow for a locking action to occur on a strap, cord, cable, or seat belt-like web threaded therethrough in the event of material failure.

These and other objects, advantages, and features are accomplished by the provision of an apparatus for securing cargo to a vehicle seat with a rear by anchoring a strap to the vehicle seat, comprising: an anchor plate; and wedge-shaped slotted means communicably attached to-the anchor plate for channeling the strap therethrough, wherein the strap is arranged to secure the cargo placed in the vehicle seat in such a manner that the anchor plate bears against the rear of the vehicle seat, thereby securing the cargo to the vehicle seat.

These and other objects, advantages, and features are accomplished by the provision of a method of securing cargo in a vehicle seat having a bottom cushion and an upright cushion, the vehicle seat having a rear comprising a lower portion of the upright cushion and a back of the bottom cushion, comprising the steps of: threading a strap through a wedge-shaped slotted region communicably attached to an anchor plate; passing the strap through a gap between the bottom cushion and the upright cushion of the vehicle seat; placing the anchor plate against the rear of the vehicle seat; and securing the cargo to the vehicle seat with the strap, thereby making the anchor plate bear against the vehicle seat.

These and other objects, advantages, and features are accomplished by the provision of an apparatus for locking a strap, comprising: a plate; and a wedge-shaped plug formed by converging slots for threading the strap therethrough, the wedge-shaped plug communicably attached to the plate with a breakable portion therebetween, wherein under Sufficient force applied to the strap, the breakable portion will break, thereby wedging and locking the strap between the wedge-shaped plug an a remaining part of the plate.

These and other objects, advantages, and features are accomplished by the provision Of an apparatus for anchoring a strap to a vehicle seat with a rear, comprising: anchoring means for bearing against the rear of the vehicle seat; and securing means communicably attached to the anchoring means for securing the strap, wherein the strap is one of attached to, secured to, and tightened around cargo placed in the vehicle seat to make the anchoring means bear against the rear of the vehicle seat, thereby securing the cargo to the vehicle seat.

These and other objects, advantages, and features are accomplished by the provision of a method of securing cargo in a vehicle seat having a bottom cushion and an upright cushion, the vehicle seat having a front and a rear, the rear comprising a lower portion of the upright cushion and a back of the bottom cushion, comprising the steps of: passing an anchor plate with a strap attached thereto from the front of the vehicle seat to the rear of the vehicle seat through a gap between the bottom cushion and the upright cushion of the vehicle seat; fastening the cargo with the strap in the vehicle seat; placing the anchor plate to span the gap between the bottom cushion and the upright cushion of the vehicle seat; and tightening the strap to secure the cargo and to make the anchor plate bear against the rear of the vehicle seat.

These and other objects, advantages, and features are accomplished by the provision of a method of securing cargo in a vehicle seat having a bottom cushion and an upright cushion, the vehicle seat having a rear comprising a lower portion of the upright cushion and a back of the bottom cushion, comprising the steps of: attaching a strap to an anchor plate; passing the strap through a gap between the bottom cushion and the upright cushion of the vehicle seat; placing the anchor plate against the rear of the vehicle seat; and securing the cargo to the vehicle seat with the strap, thereby making the anchor plate bear against the vehicle seat.

These and other objects, advantages, and features are accomplished by the provision of a method of dampening the force of stopping a vehicle on cargo placed in a vehicle seat in the vehicle, the vehicle seat having a bottom cushion, an upright cushion, a front, and a rear, the rear comprising a lower portion of the upright cushion and a back of the bottom cushion, comprising the steps of: passing an anchor plate with a strap attached thereto from the front of the vehicle seat to the rear of the vehicle seat through a gap between the bottom cushion and the upright cushion of the vehicle seat; fastening the cargo with the strap in the vehicle seat; placing the anchor plate to span the gap between the bottom cushion and the upright cushion of the vehicle seat; tightening the strap to secure the cargo and to make the anchor plate bear against the rear of the vehicle Seat; and dampening the force on the cargo during stopping of the vehicle by the anchor plate causing the compression of the bottom cushion and the upright cushion of the vehicle seat.

These and other objects, advantages, and features are accomplished by the provision of a method of making an anchor plate with slots for use to secure cargo in a vehicle seat, comprising the steps of: aligning injection mold plates having means for forming the anchor plate with slots; mating the injection mold plates; heating the injection mold plates; injecting molten plastic within the injection mold plates to form the anchor plates with slots; cooling the injection mold plates; opening the injection mold plates; and removing the anchor plate with slots once formed from the injection mold plates.

To help ameliorate the problems associated with firmly restraining cargo in or on a vehicle seat, or to enhance the use of seat belts therefor, the present invention involves an apparatus and method employing an anchor plate with a strap, cord, or cable, and uses the vehicle seat itself. The apparatus and method of the present invention includes an anchor plate with strap, cord, or cable threaded therethrough that spans the gap provided by the space or margin between the seat upright cushion and the seat bottom cushion of the vehicle seat. The invention imparts force on the vehicle seat during impact, accident, or sudden stopping of the vehicle, or while traveling around a curve of sufficient radius or at high enough speed, and prevents tumbling or disengagement of the cargo secured in or on the vehicle seat by the strap, cord, or cable.

The apparatus is made operational by having the strap, cord, or cable attached to an anchor plate, and positioning the anchor plate at the rear of the vehicle seat. One way to position the anchor plate would be to pass it through the margin or space between the seat upright cushion and the seat bottom cushion to be located to span the gap formed therefrom. Once positioned, the anchor plate would press against this seat upright cushion and seat bottom cushion and therefore bear against the rear of this vehicle seat while thoroughly securing cargo in or on this vehicle seat by this strap, cord, or cable. In order to work, the anchor plate would not necessarily have to be passed between the seat cushions as above. Instead, the strap, cord, or cable may be passed through the aforementioned margin or space. With cargo thereby secured, the forces of impact or sudden stopping of the vehicle are transmitted from the cargo to the strap, cord, or cable, which in turn transmits these forces to the anchor plate. The anchor plate further transmits these forces to the vehicle seat upright cushion and seat bottom cushion with the anchor plate pressing against and secured thereto, followed by transmission of these forces from these vehicle seat cushions to the vehicle frame through the vehicle seat. In operation, the apparatus can use the dampening effect of the seat cushions to dampen the force of impact or sudden stopping of the vehicle upon the restrained cargo or the apparatus itself.

The anchor plate is constructed with specially designed anchor plate slots and anchor plate material or plug of material therebetween as described below over which the strap, cord, or cable is threaded therethrough. The distinctive features of the design provide an additional margin of safety in the form of a secondary fail-safe locking mechanism in the event of material failure or disjoining between the anchor plate slots. Specifically, the anchor plate slots and the anchor plate material or plug of material therebetween define a wedge-shaped cross-section. Upon material failure or disjoining of this plug of material from the rest of the anchor plate during impact or sudden stopping of the vehicle, this secondary fail-safe locking mechanism will cause the strap, cord, or cable to be wedged or locked against the unbroken portion of the anchor plate or anchor plate slots. The wedging or locking action will prevent slipping of the strap, cord, or cable, and thus maintain the cargo in or on the vehicle seat secured and restrained thereto.

DETAILED DESCRIPTION OF THE PREFERRED EMBODIMENTS

Figure 1:
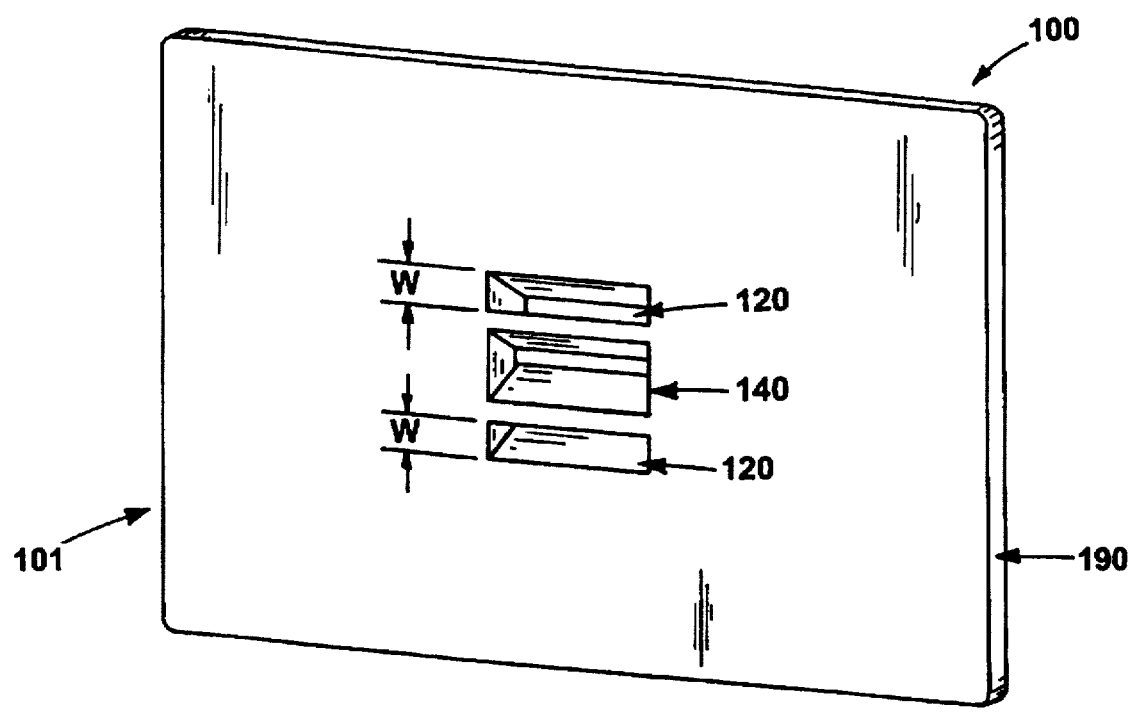
FIG. 1 shows a view of the back of the anchor plate having converging slots and wedge region or wedge-shaped plug of material, wherein this back faces rearward in the vehicle relative to both the secured cargo and the rear of the vehicle seat when the anchor plate bears thereon with straps, cords, or cables restraining this cargo.

The apparatus shown in FIG. 1 is a view of a back 101 of a flat or curved anchor plate 100 made of plastic, metal, or composite material, and sized substantially four inches wide by six inches long by ½ inch deep. The view faces rearward in a vehicle, or in general, away from both the cargo being secured(not shown) and the back or rear of the vehicle seat or seat assembly (not shown) when anchor plate 100 is secured thereto with strap, cord, or cable 280 (not shown). Strap, cord, or cable 280 is secured around, through, or otherwise to secure that cargo in or on the vehicle seat 200 (not shown). Strap, cord, or cable 280 may also be made at least in part a solid bar member. Anchor plate 100 has converging anchor plate slots or holes 120 and anchor plate wedge region or plug of wedge-shaped material 140 therewithin.

Figures 2A, 2B:
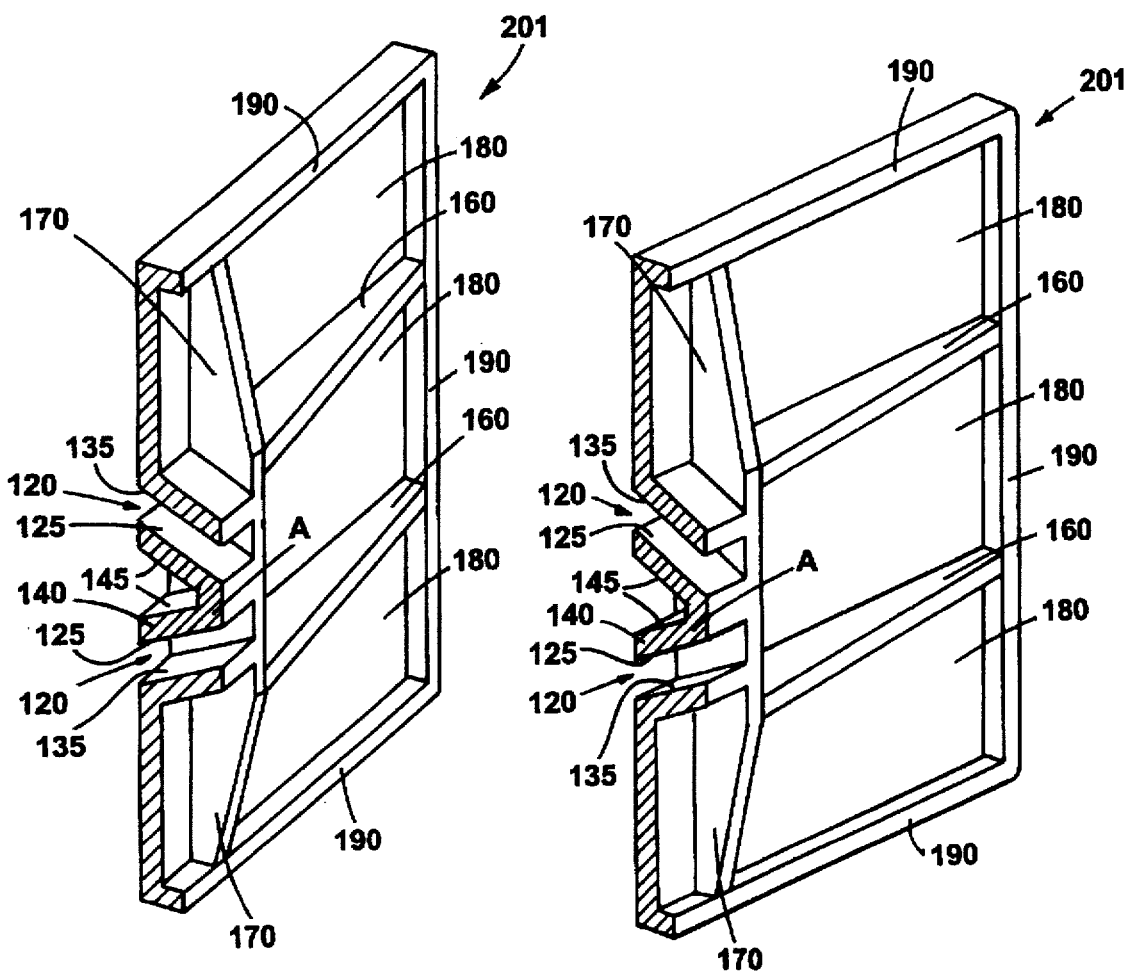
FIGS. 2A and 2B show sectional perspective views cut along section A—A of FIG. 4 of the opposite side, the front which faces the rear of the vehicle seat, of the anchor plate relative to FIG. 1 to more perfectly illustrate the converging slots with the wedge region therebetween.
Figure 3:
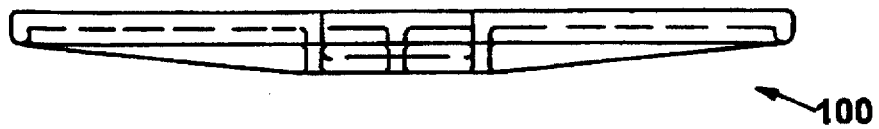
FIG. 3 shows a sectional view corresponding to section A—A of FIG. 4 of the anchor plate.

In FIGS. 2A and 2B, sectioned perspective views of the opposite side, i.e., front 201, relative to the view depicted in FIG. 1, of anchor plate 100 are shown to more perfectly illustrate the convergence of converging slots 120 with wedge region 140 therebetween. As illustrated in FIGS. 2A and 2B, converging slots 120 are defined by surfaces 125 and 135 and wedge region 140 is defined by surfaces 125 and 145 therebetween. Strap, cord, or cable 280 is threaded through slots 120 around wedge region 140 (not shown), or is otherwise permanently or nonpermanently attached thereto by any means known to the art, and is used to restrain cargo in or on vehicle seat 200 (not shown).

In a typical use, anchor plate 100 with attached strap, cord, or cable 280 is passed from front to rear through gap or margin 220 (not shown), formed by seat assembly 200 (not shown) comprised of vehicle seat upright cushion 240 and seat bottom cushion 260. Anchor plate 100 is then positioned to span the space or margin of gap 220 to thoroughly anchor, secure, or restrain cargo (not shown) to seat assembly 200 and placed therein or thereon by using attached strap, cord, or cable 280.

Figure 4:
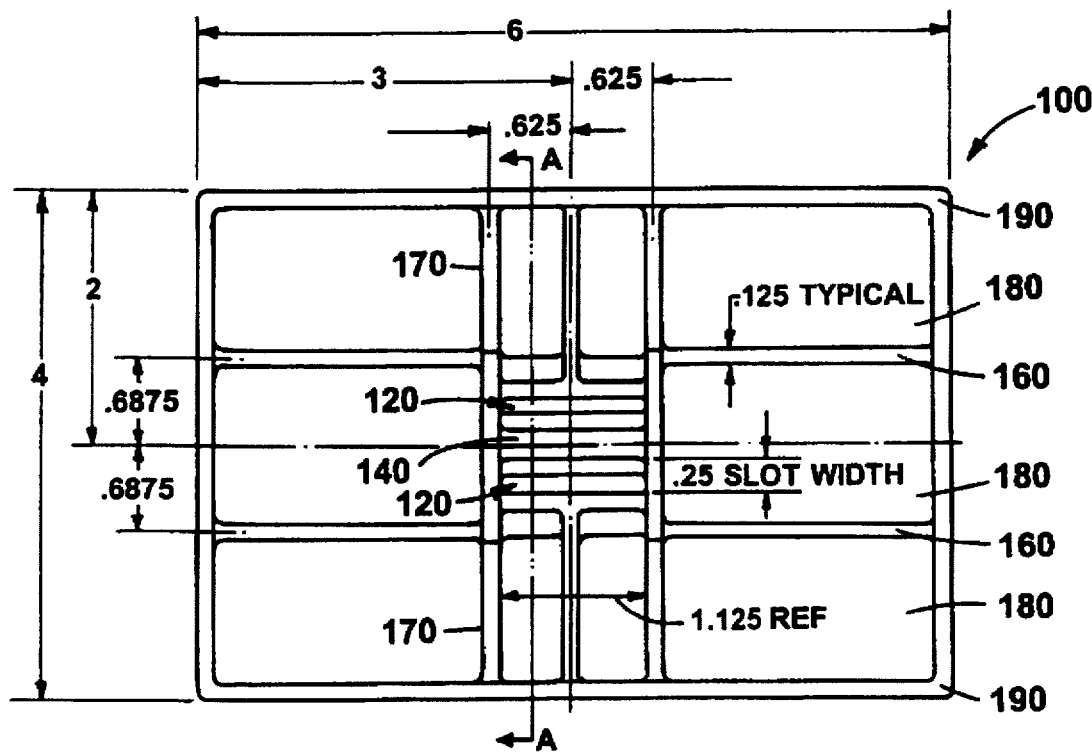
FIG. 4 shows a direct front view of the anchor plate with typical dimensions indicated thereof.

FIG. 4 shows a direct front view of anchor plate 100 with typical dimensions indicated thereof.

Figure 5:
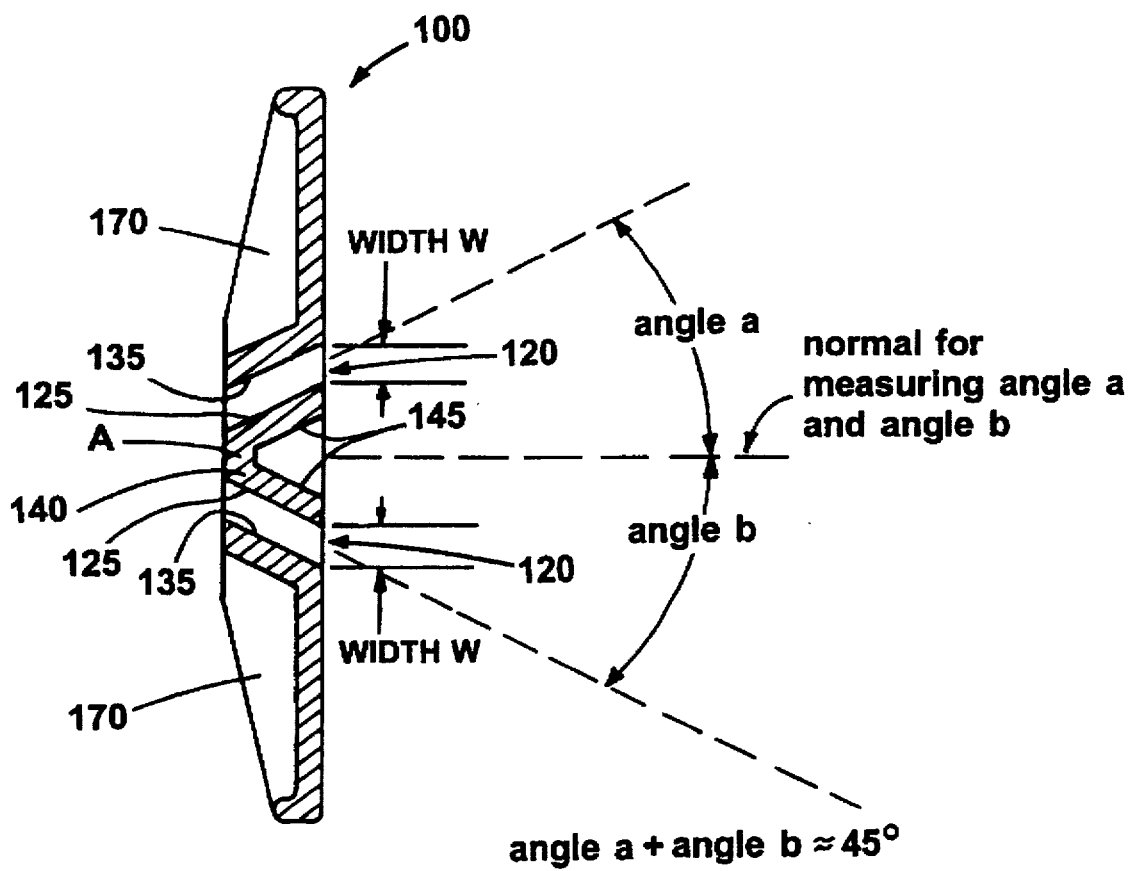
FIG. 5 shows a sectional end view along section A—A of FIG. 4 to better illustrate the converging slots and wedge region of the anchor plate with typical dimensions indicated thereof.

FIG. 5 shows an oblique sectional projection along section A—A of FIG. 4 to better illustrate converging slots 120 with wedge region 140 therebetween of anchor plate 100, again with typical dimensions indicated thereof.

Figure 6:
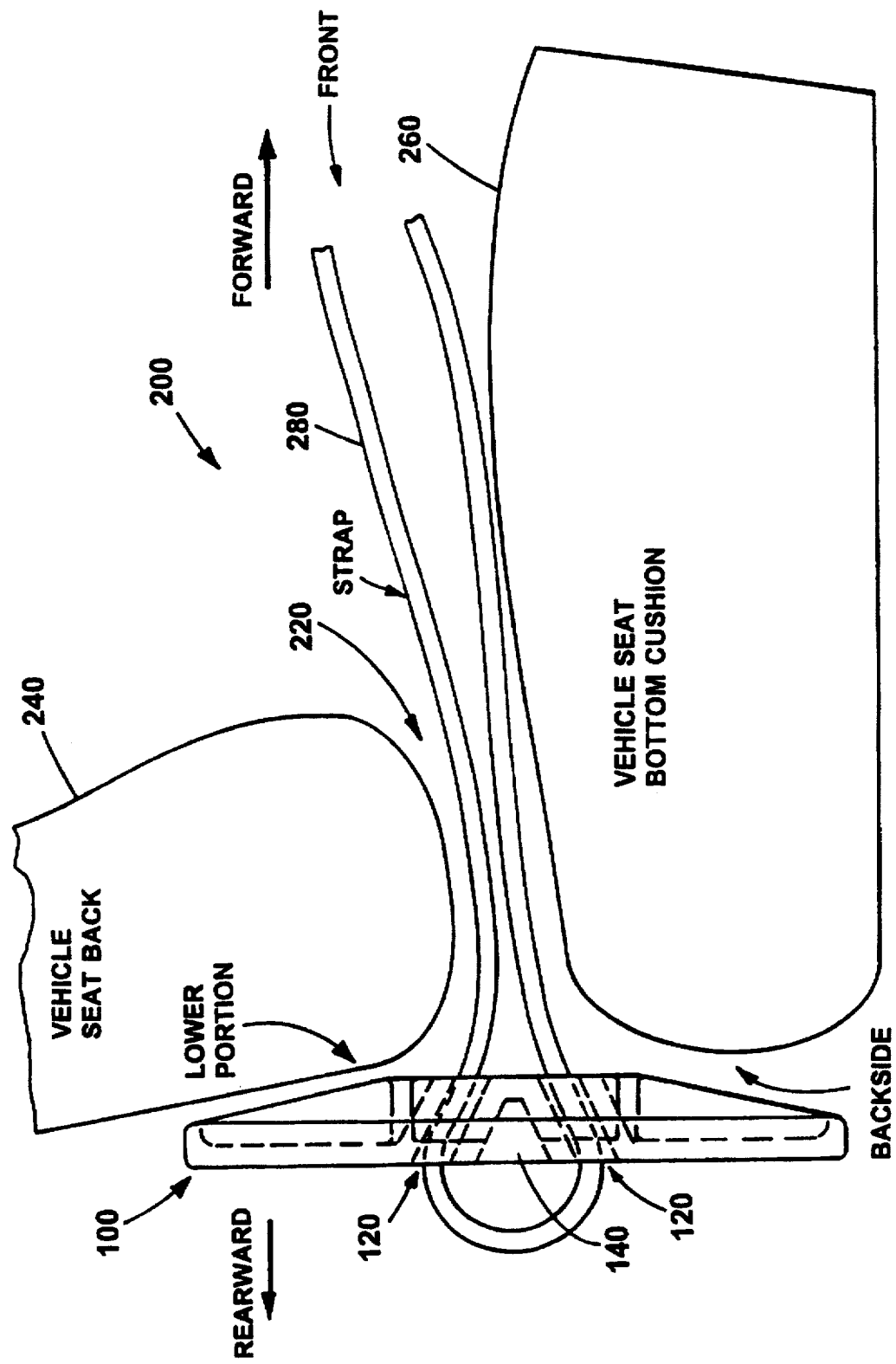
FIG. 6 shows the anchor plate with converging slots and wedge region in position spanning the gap or margin between the upright seat cushion and the bottom seat cushion of the vehicle seat, and the installation of the strap, cord, or cable threaded therethrough.

FIG. 6 shows anchor plate 100 with converging slots 120 with wedge region 140 therebetween in position spanning gap 220 between upright seat cushion 240 and bottom seat cushion 260 of vehicle seat 200, and the installation of strap, cord, or cable 280 threaded therethrough.

In use, anchor plate 100 with strap, cord, or cable 280 threaded therethrough, or otherwise permanently attached thereto is passed through gap 220 from front to rear of seat assembly 200 and secured thereto to span gap 220 by tightening strap, cord, or cable 280 around, through, or otherwise to cargo (not shown) in or on seat assembly 200. Alternatively, strap, cord, or cable 280 could be tightened around, through, or attached otherwise to a container (not shown) in or on seat assembly 200 containing cargo or used to contain cargo therein.

Anchor plate slots 120 are made or shaped to provide a wedge-shaped cross-section of anchor plate material or plug of material 140 therebetween with slots 120 converging toward one side, front 201, of anchor plate 100 for strap, cord, or cable 280 to be threaded therethrough, or otherwise permanently or nonpermanently attached. Plug of material 140 thereby provides a secondary fail-safe locking mechanism in the event of material failure or plug of material 140 disjoining from anchor plate 100 upon extremely forceful impact or sudden stopping of the vehicle. In particular, in such disjoining event upon impact or sudden stopping of the vehicle, plug of material 140 with strap, cord, or cable 280 threaded thereover, or otherwise permanently or nonpermanently attached, will wedge into the nondisjoined part of converging slots 120. In other words, plug of material 140 will wedge against surfaces 135, or into the remaining unbroken part of anchor plate 100, with strap, cord, or cable 280 therebetween, and thereby provide a wedging action or locking feature to prevent slipping of strap, cord, or cable 280. In so doing, that cargo remains secured in or on vehicle seat assembly 200 and does not tumble or become disengaged therefrom.

In order for the secondary fail-safe locking mechanism to work, it is requisite that width w (FIGS. 1, 5, and 8) of each one of converging slots 120 be substantially at most 104% of the thickness of strap, cord, cable 280, although width w may be narrower than strap, cord, or cable 280 if strap, cord, or cable 280 is compressible (i.e., in the instant case width w<100% of the thickness of strap, cord., or cable 280). In a different embodiment of the invention, width w may also be wider than strap, cord, or cable 280 (i.e., in this instant case width w>100% of the thickness of strap, cord, or cable 280) if portions of plug of material 140 overlap portions of anchor plate 100 as discussed below (also see FIG. 7), or if a compressible or noncompressible insert is placed around or next to the portion of strap, cord, or cable 280 within slots 120 to make up for the width difference between slots 120 and strap, cord, or cable 280 (not illustrated). In a further embodiment of the invention, width w of slots 120 is equal to the width of strap, cord, or cable 280. Also, converging anchor plate slots 120 form substantially a 45 degree included angle relative to each other as shown in FIG. 5, i.e., angle a+ angle b ≈45 degrees in FIG. 5, although any angles may be used for angle a and angle b as long as 90 degrees>angle a>0 degrees and 90 degrees>angle b>0 degrees. Also, angle a and angle b each are measured relative to a normal to the anchor plate 100 as shown in FIG. 5.

Figure 7:
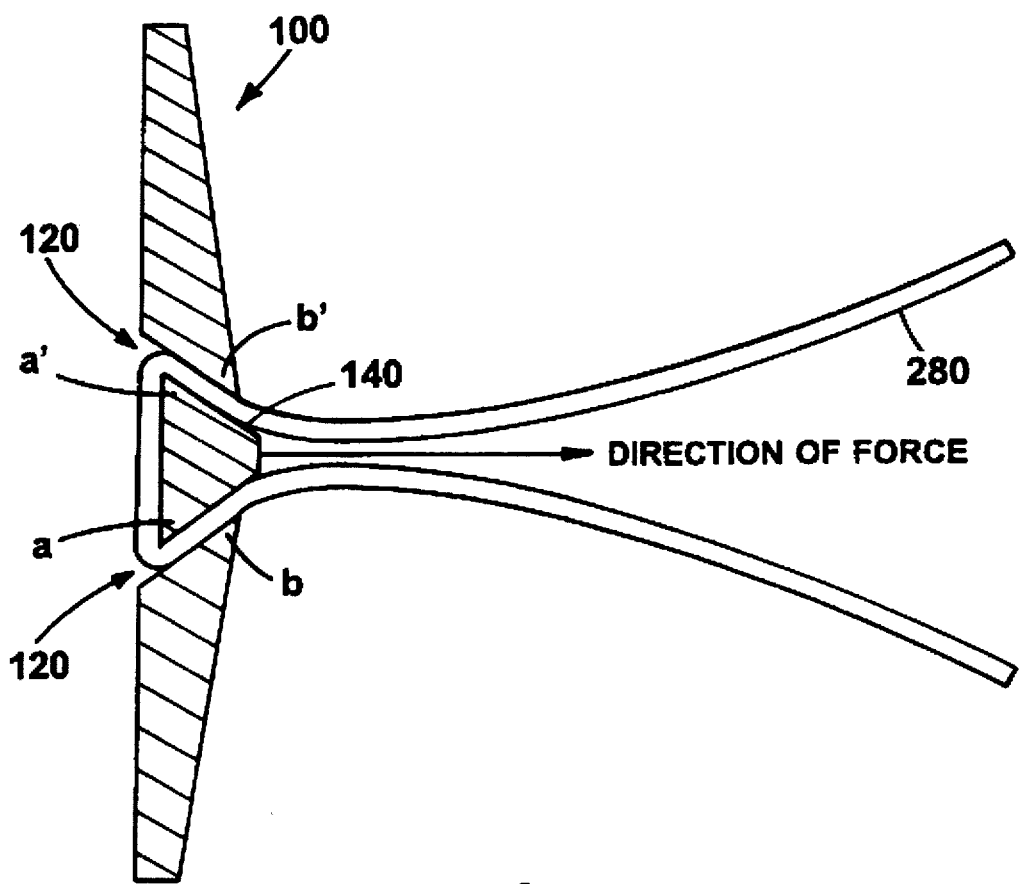
FIG. 7 shows the wedging or locking action of the wedge region of the anchor plate on the strap, cord, or cable threaded therethrough after material failure during impact or sudden stopping of the vehicle.

When wedge-shaped plug 140 is in the fail-safe position after material failure as illustrated in FIG. 7, opposite sides of each of converging slots 120 bear against strap, cord, or cable 280 threaded therebetween, thereby producing a locking action on strap, cord, or cable 280 to prevent slipping. Facilitation of this locking action is made possible by arranging anchor plate 100 and wedge-shaped plug 140 so that flanged portions a and a' of plug 140 overlap flanged portions b and b' of anchor plated 100, respectively, across the respective portions of strap, cord, or cable 280 threaded therebetween as shown in FIG. 7. Although overlap of these flanged portions a and a' over b and b', respectively, is ideal, this is not a requirement for a working apparatus, as long as slots 120 are converging and the threaded portions of strap, cord, or cable 280 are compressible in their respective slots 120. With slot width substantially at most 104% of the thickness of strap, cord, or cable 280, this latter working arrangement is quite possible.

Figure 8A:
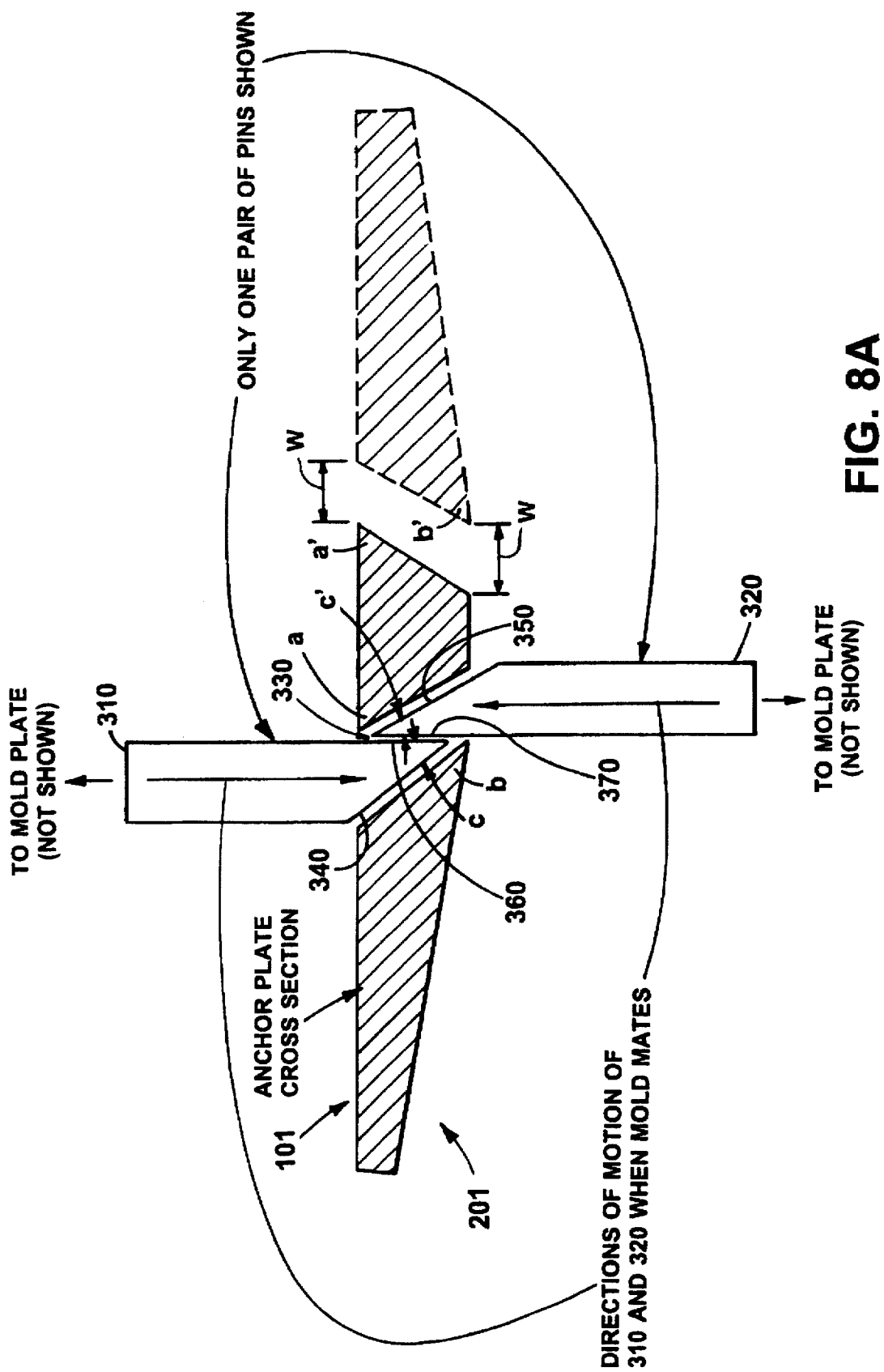
FIGS. 8A and 8B show a method for making the wedge region of the anchor plate with an arrangement of molding pins.
Figure 8B:
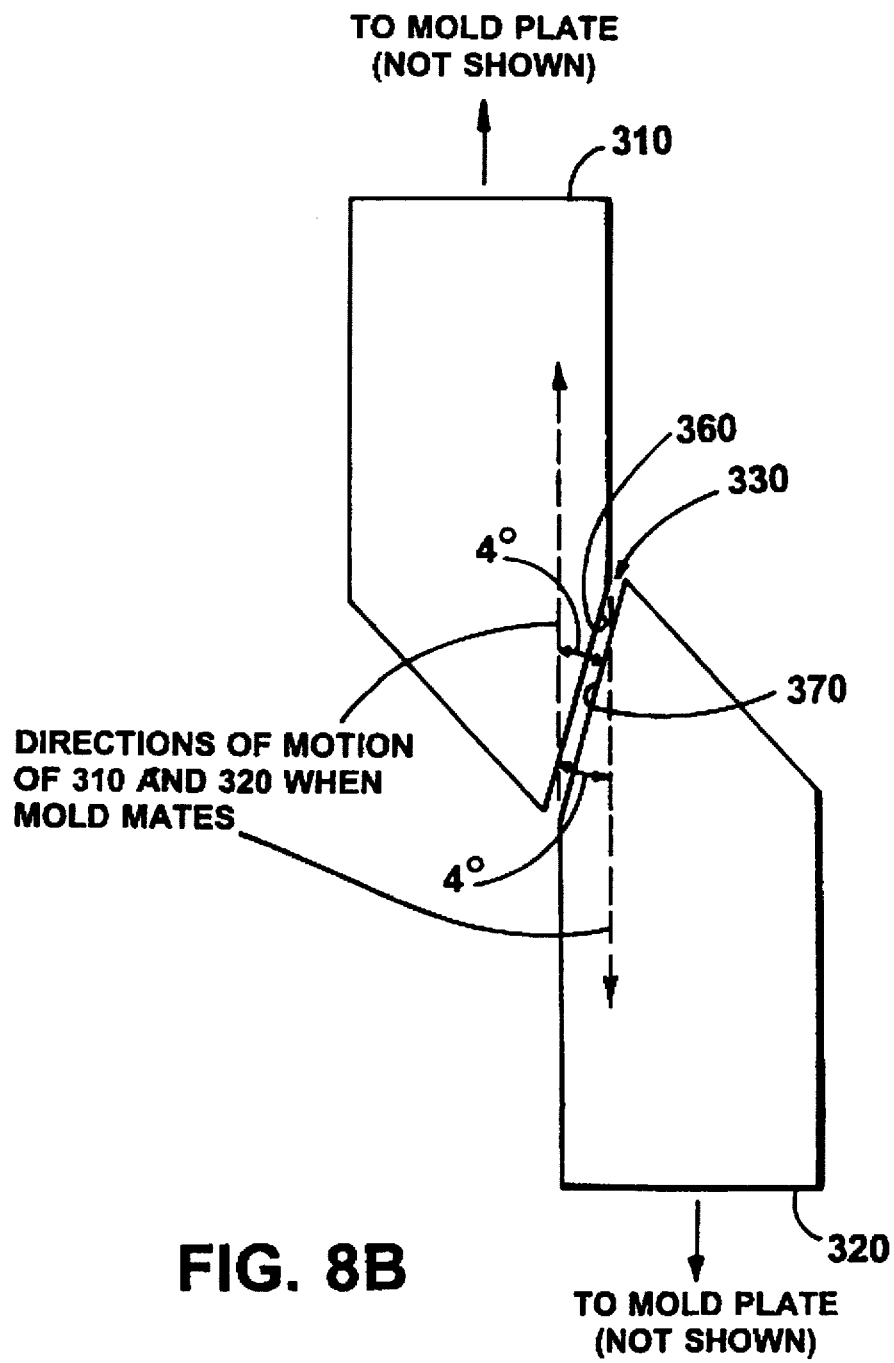

As is known to one skilled in the art, when anchor plate 100 is made in a molding process using the conventional method for making slots like slots 120, flange portions a and a' will not substantially overlap flange portion b and b', respectively- In the conventional molding method, oppositely directed pairs of corresponding pins are used in the mold to form slots like slots 120. FIG. 8 shows an arrangement of pins 310 and 320 used to make a slot like slots 120 in a molding process. The included angles c and c' of pins 310 and 320, respectively, are substantially 45 degrees plus no less than 4 degrees. Pins 310 and 320 are brought together in the molding process in the directions of the arrows in FIG. 8A, and have substantially identical shape in the vicinity of overlap or contact region 330. The angle of the slot, such as angle a or angle b above, is determined by the sloped faces 340 and 350 of pins 310 and 320, respectively. The angle measured between the mating faces 3.60 and 370 of pins 310 and 320, respectively, and the direction of motion of pins 310 and 320, respectively must be no less than 4 degrees as shown in FIG. 8B. This is so that mating faces 360 and 370 will meet each other in proper position with zero relative motion to prevent sliding against each other when pins 310 and 320 are moved fully into the molding position. As discussed above, in the conventional molding process illustrated in FIG. 8A, flange portions a and a' do not overlap flange portions b and b', respectively, but the locking action on strap, cord, or cable 280 (not shown) will still occur in the event of material failure because the molded slot width of slot 120 is sufficiently.

Figure 9:
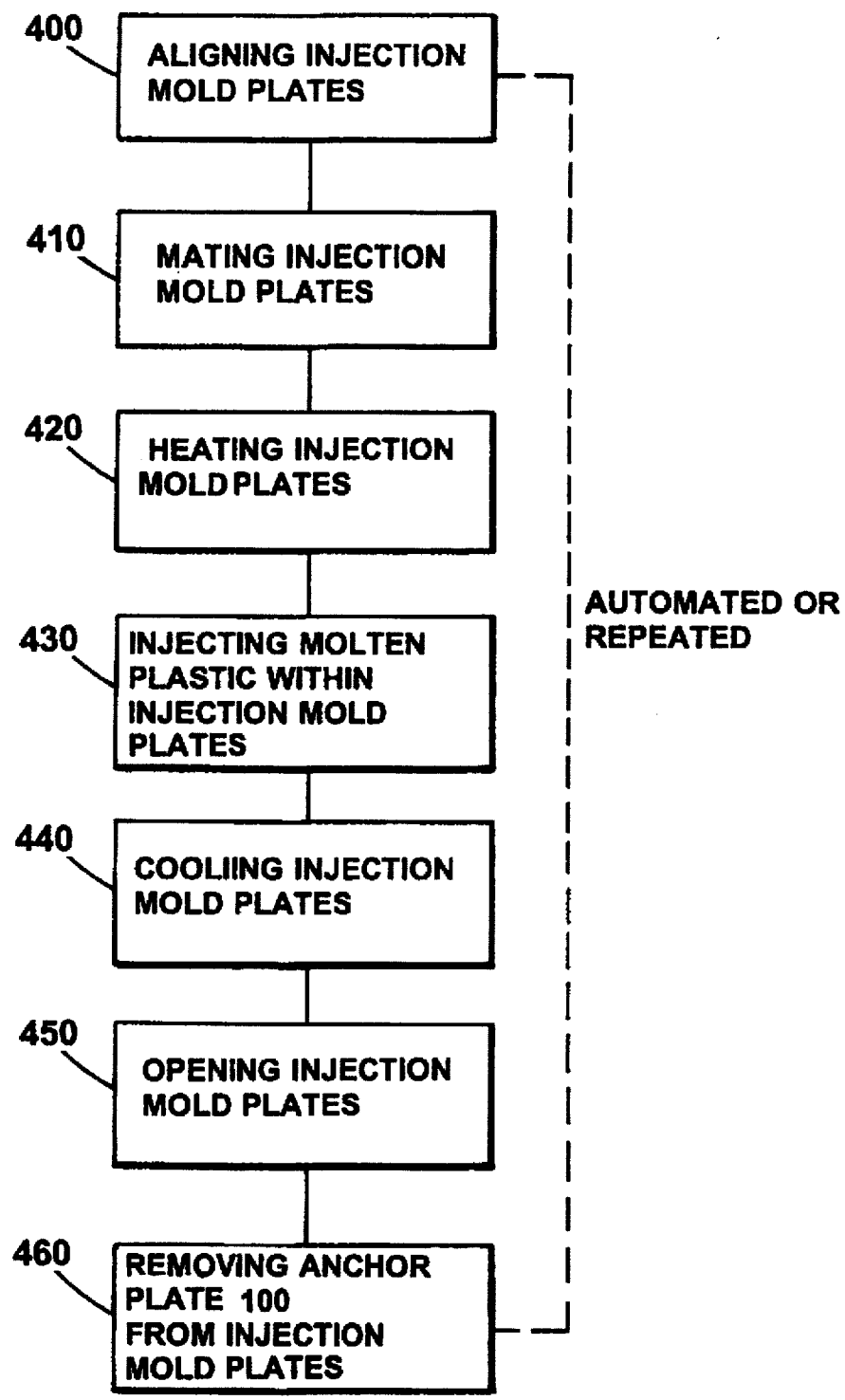
FIG. 9 illustrates the steps involved in making the anchor plate by injection molding.

A method of making anchor plate 100 for use to secure cargo in or on seat unit 200 is shown in FIG. 9 and includes step 400 for aligning injection mold plates having at least one pair of pins for forming anchor plate 100 with slots 120; step 410 for mating those injection mold plates; step 420 for heating those injection mold plates; step 430 for injecting molten plastic within those injection mold plates to form anchor plate 100; step 440 for cooling those injection mold plates; step 450 for opening those injection mold plates; and step 460 for removing anchor plate 100 once formed from those injection mold plates. The process may be automated or repeated to make many samples of anchor plate 100.

Anchor plate 100 must have sufficient stiffness and strength to allow the forces of impact or sudden stopping of the vehicle to be transmitted thereto during deceleration and to be further transmitted to vehicle seat upright cushion 240 and bottom cushion 260 of seat assembly 200. Dampening of these forces may occur due to the compressibility of seat upright cushion 240 and bottom cushion 260 if they are compressed by anchor plate 100 during impact or sudden stopping of the vehicle. Anchor plate 100 must also be of sufficient Stiffness and strength to withstand the aforementioned wedging action of plug of material 140 with strap, cord, or cable 280 thereover in the event plug of material 140 disjoins from anchor plate 100 upon such impact or sudden stopping. Much of the strength of plug of material 140, and indeed anchor plate 100, depends on the cross-sectional area A of plug of material 140, where plug of material 140 is communicably attached on either side to walls 170 as illustrated in FIGS. 2 and 5.

Strength and stiffness of anchor plate 100 is also provided by webs 180 and walls 160, 170, and 190 shown in FIGS. 2A, 2B, and 4. In the event of an extremely forceful impact or sudden stopping of the vehicle, anchor plate 100 is designed to have plug of material 140 disjoin before any breakage or fracture occurs to webs 180 or walls 160, 170, and 190. In this way, the aforementioned wedging action of plug of material 140 would ensue properly.

In one embodiment of the invention, the composite material forming anchor plate 100 is polycarbonate.

In another embodiment of the invention, the composite material forming anchor plate 100 is a plastic epoxy resin.

In another embodiment of the invention, strap, cord, or cable 280 has at least one portion that is a solid material member.

In another embodiment of the invention, strap, cord, or cable 280 is a solid material member.

In another embodiment of the invention, strap, cord, or cable 280 is a composite material member.

In another embodiment of the invention, strap, cord, or cable 280 is a plastic material member.

In another embodiment of the invention, strap, cord, or cable 280 is a bar.

In still another embodiment of the invention, strap, cord, or cable 280 is a seat belt-type web.

In still another embodiment of the invention, a stack of plates like anchor plate 100 is used to secure cargo in or on seat unit 200 instead of a single anchor plate 100.

In still another embodiment of the invention, slots 120 are substantially parallel instead of converging.

In still another embodiment of the invention, a stack of plates like anchor plate 100, with at least one containing therein converging slots 120 and at least one other containing therein instead slots like slots 120 that are substantially parallel to secure cargo in or on seat unit 200 instead of a single anchor plate 100.

In yet another embodiment of the invention, anchor plate 100 has two pairs of converging slots 120 with respective wedge-shaped plugs of material 140 therebetween.

In a further embodiment of the invention, anchor plate 100 has three pairs of converging slots 120 with respective wedge-shaped plugs of material 140 therebetween.

In still a further embodiment of the invention, anchor plate 100 has four pairs of converging slots 120 with respective wedge-shaped plugs of material 140 therebetween.

In another embodiment of the invention, anchor plate 100 has a plurality of pairs of converging slots 120 with a respective plurality of wedge-shaped plugs of material 140 therebetween.

In yet a further embodiment of the invention, the length of anchor plate 100 is substantially the same as the width of vehicle seat assembly 200.

In one further embodiment of the invention, anchor plate 100 has an adjustable length.

In still one further embodiment of the invention, anchor plate 100 has an adjustable width.

In still another embodiment of the invention, anchor plate 100 has at least one other plate placed either in front of, or behind anchor plate 100 in operation and having one or more longer slots in the horizontal direction than slots 120 in anchor plate 100, wherein anchor plate 100 can be slid horizontally along this at least one other plate before strap, cord, or cable 280 is secured around, through, or otherwise to cargo placed in or on seat unit 200.

In yet one further embodiment of the invention, anchor plate 100 is made with all webs and walls substantially ⅛ inch thick and with all fillets and rounds having radii substantially 5/80 (=1/16=0.0625) inch.

Numerous and additional modifications and variations of the present invention are possible in light of the above teachings. It is therefore to be understood that within the scope of the appended claims, the invention may be practiced Otherwise as specifically claimed.

What is claimed is:

1. A method of securing cargo in a vehicle seat having a bottom cushion and an upright cushion, the vehicle seat having a rear including a lower portion of the upright cushion and a back of the bottom cushion, comprising the steps of:

channeling a strap at an angle through a convergent region communicably attached to an anchor plate;

passing the strap through a gap between the bottom cushion and the upright cushion of the vehicle seat;

placing the anchor plate against the rear of the vehicle seat;

securing the cargo to the vehicle seat with the strap; and in response to said securing step, bearing the anchor plate against the vehicle seat to thoroughly secure the cargo.

2. The method as claimed in claim 1, wherein the convergent region defines a wedge-shaped slotted region, and wherein said channeling step includes a step of channeling a strap through the wedge-shaped slotted region.

3. The method as claimed in claim 1, wherein said channeling step includes a step of forming convergent strap portions in channeling through the convergent region.

4. The method as claimed in claim 1, wherein said channeling step is accomplished with a contiguous portion of the strap and said passing step includes a step of passing two contiguous portions of the strap through the gap between the bottom cushion and the upright cushion of the vehicle seat.

5. The method as claimed in claim 1, further comprising a step of, in the event of breakage of the anchor plate, locking the strap with the anchor plate.

6. A method of securing cargo in a vehicle seat in a vehicle, the vehicle seat having a bottom cushion, an upright cushion, a front and a rear, the rear including a lower portion of the upright cushion and a back of thee bottom cushion, comprising steps of:

passing the anchor plate with a strap attached thereto from the front of the vehicle seat to the rear of the vehicle seat through a gap between the bottom cushion and the upright cushion of the vehicle seat;

fastening the cargo with the strap in the vehicle seat;

placing the anchor plate to span the gap between the bottom cushion and the upright cushion of the vehicle seat;

tightening the strap to secure the cargo; and in response to said tightening step, bearing the anchor plate against the rear of the vehicle seat to thoroughly secure the cargo.

7. The method as claimed in claim 6, further including a step of channeling the strap at an angle through the anchor plate.

8. The method of claim 7, wherein said channeling step includes a step of channeling the strap at an angle of approximately forty-five degrees through the anchor plate.

9. The method of claim 6, further including a step of channeling the strap at a fixed angle through the anchor plate.

10. The method as claimed in claim 6, further comprising a step of channeling the strap twice at an angle through the anchor plate.

11. The method as claimed in claim 6, further comprising steps of channeling a strap at a first angle through the anchor plate from a first side of the anchor plate to a second side of the anchor plate, channeling a strap at a second angle through the anchor plate from the second side of the anchor plate to the first side of the anchor plate.

12. The method as claimed in claim 6, wherein said tightening step includes a step of thoroughly tightening the cargo with the strap to the vehicle seat.

13. The method as claimed in claim 6, wherein said tightening step includes a step of thoroughly tightening the cargo with the strap to make the anchor plate bear against the vehicle seat.

14. The method as claimed in claim 6, further including a step of converging strap portions in channeling the strap portions through the anchor plate.

15. The method as claimed in claim 6, further including steps of looping a strap around a portion of the anchor plate, and channeling strap portions through the anchor plate.

16. The method as claimed in claim 15, further including a step of converging strap portions in channeling the strap portions through the anchor plate.

17. The method as claimed in claim 6, further comprising a step of, in the event of breakage of the anchor plate, locking the strap with the anchor plate.

18. The method as claimed in claim 6, further comprising a step of, in the event of sudden stopping of the vehicle causing breakage of a portion of the anchor plate, further securing the cargo by wedging the strap between the portion and a remaining part of the anchor plate.

19. The method as claimed in claim 6, further comprising a step of, in the event of breakage of the anchor plate, wedging the strap between portions of the anchor plate.

20. A method of securing cargo in a vehicle seat having a bottom cushion and an upright cushion, the vehicle seat having a rear including a lower portion of the upright cushion and a back of the bottom cushion, comprising steps of:

attaching a strap to an anchor plate;

passing the strap through a gap between the bottom cushion and the upright cushion of the vehicle seat;

placing the anchor plate against the rear of the vehicle seat;

securing the cargo to the vehicle seat with the strap; and in response to said securing step, bearing the anchor plate against the vehicle seat to thoroughly secure the cargo.

21. A method of dampening the force of stopping a vehicle on cargo placed in a vehicle seat in the vehicle, the vehicle seat having a bottom cushion, a front, and a rear, the rear including a lower portion of the upright cushion and a back of the bottom cushion, comprising steps of:

passing an anchor plate with a strap attached thereto from the front of the vehicle seat to the rear of the vehicle seat through a gap between the bottom cushion and the upright cushion of the vehicle seat;

fastening the cargo with the strap in the vehicle seat;

placing the anchor plate to span the gap between the bottom cushion and the upright cushion of the vehicle seat;

tightening the strap to secure the cargo and to make the anchor plate bear against the rear of the vehicle seat in securing the cargo; and dampening the force on the cargo during stopping of the vehicle by compressing the bottom cushion and the upright cushion of the vehicle seat with the anchor plate.

22. The method of claim 21, further comprising a step of channeling the strap at an angle through an anchor plate.

* * * * *

UNITED STATES PATENT AND TRADEMARK OFFICE
CERTIFICATE OF CORRECTION

PATENT NO.   : 5,641,254

DATED        : June 24, 1997

INVENTOR(S)  : Daniel B. Sullivan

It is certified that error appears in the above-identified patent and that said Letters Patent is hereby corrected as shown below:

Col. 2, line 45, please delete "Sufficient", and replace with --sufficient--.

Col. 2, line 51, please delete "Of", and replace with --of--.

Col. 3, line 33, please delete "Seat", and replace with --seat--.

Col. 7, line 7, please delete "-", and replace with --.--.

Col. 7, line 19, please delete "3.60", and replace with --360--.

Col. 7, line 53, please delete "Stiffness", and replace with --stiffness--.

Col. 9, line 5, please delete "Otherwise", and replace with --otherwise--.

Col. 9, claim 6, line 41, please delete "thee", and replace with --the--.

Signed and Sealed this

Ninth Day of September, 1997

*Attest:*

BRUCE LEHMAN

*Attesting Officer*     *Commissioner of Patents and Trademarks*